US010938523B2

(12) United States Patent
Zhang (10) Patent No.: US 10,938,523 B2
(45) Date of Patent: Mar. 2, 2021

(54) WLAN RF ENVIRONMENT EVALUATION FOR 802.11AC CHANNELS

(71) Applicant: NetAlly, LLC, Colorado Springs, CO (US)

(72) Inventor: Congzhen Zhang, Beijing (CN)

(73) Assignee: NetAlly, LLC, Colorado Springs, CO (US)

( * ) Notice: Subject to any disclaimer, the term of this patent is extended or adjusted under 35 U.S.C. 154(b) by 2 days.

(21) Appl. No.: 16/333,160

(22) PCT Filed: Oct. 13, 2016

(86) PCT No.: PCT/US2016/056792
§ 371 (c)(1),
(2) Date: Mar. 13, 2019

(87) PCT Pub. No.: WO2018/071022
PCT Pub. Date: Apr. 19, 2018

(65) Prior Publication Data
US 2020/0014500 A1     Jan. 9, 2020

(51) Int. Cl.
*H04L 1/20*     (2006.01)
*H04L 1/00*     (2006.01)
(Continued)

(52) U.S. Cl.
CPC ............... *H04L 1/20* (2013.01); *H04L 1/001* (2013.01); *H04L 1/0004* (2013.01);
(Continued)

(58) Field of Classification Search
CPC ......... H04L 1/20; H04L 1/0004; H04L 1/001; H04L 5/0035; H04L 1/1607; H04L 1/00;
(Continued)

(56) References Cited

U.S. PATENT DOCUMENTS 8,780,943 B2 *   7/2014  Moshfeghi ........... H04B 7/0408
                                                                           370/498
9,992,690 B2 *   6/2018  Butchko ................. H04L 43/50
(Continued)

FOREIGN PATENT DOCUMENTS

EP         2953289 A1    12/2015
WO    2018071022 A1    4/2018

OTHER PUBLICATIONS

International Search Report and Written Opinion for PCT/2016/056792, dated Jul. 26, 2017.
(Continued)

*Primary Examiner* — Brian T O Connor
(74) *Attorney, Agent, or Firm* — Mark H. Whittenberger; Holland & Knight LLP (57) ABSTRACT

A system for evaluating available channels in a multi-channel WLAN telecommunication system is provided. The system includes a wireless Access Point (AP) configured to provide communication over a plurality of Very High Throughput (VHT) channels. The system further includes a plurality of mobile stations (STAs) operating in the plurality of VHT channels. The system further includes a network monitoring device. The network monitoring device is configured and operable to capture a plurality of VHT data frames exchanged between the wireless AP and the plurality of STAs. The network monitoring device is further configured and operable to decode at least a portion of each of the captured plurality of VHT data frames to identify utilized VHT channel and extract channel allocation information associated with the identified VHT channel and to generate a quality score for the identified VHT channel based on the extracted channel allocation information.

18 Claims, 5 Drawing Sheets

(51) Int. Cl.
*H04W 84/12* (2009.01)
*H04W 48/20* (2009.01)
*H04W 72/08* (2009.01)
*H04W 72/00* (2009.01)
*H04L 5/00* (2006.01)

(52) U.S. Cl.
CPC ........... *H04L 5/0035* (2013.01); *H04W 48/20* (2013.01); *H04W 72/005* (2013.01); *H04W 72/085* (2013.01); *H04W 84/12* (2013.01)

(58) Field of Classification Search
CPC . H04W 48/20; H04W 72/085; H04W 72/005; H04W 84/12; H04W 74/006
See application file for complete search history.

(56) References Cited

U.S. PATENT DOCUMENTS

| | | | | |
|---|---|---|---|---|
| 10,117,119 | B2* | 10/2018 | Yu | H04W 76/15 |
| 10,645,593 | B2* | 5/2020 | Barmettler | H04W 16/18 |
| 2008/0232340 | A1 | 9/2008 | Wan et al. | |
| 2009/0067447 | A1 | 3/2009 | Giaimo et al. | |
| 2011/0116489 | A1 | 5/2011 | Grandhi | |
| 2013/0094439 | A1* | 4/2013 | Moshfeghi | H04B 7/0413 370/328 |
| 2015/0103685 | A1* | 4/2015 | Butchko | H04L 41/5067 370/252 |
| 2015/0305051 | A1 | 10/2015 | Xia et al. | |
| 2016/0044692 | A1* | 2/2016 | Egner | H04L 5/006 370/330 |
| 2017/0134990 | A1* | 5/2017 | Egner | H04W 28/26 |
| 2017/0303138 | A1* | 10/2017 | Barmettler | H04W 24/08 |
| 2017/0332263 | A1* | 11/2017 | Yu | H04W 76/18 |
| 2018/0167825 | A1* | 6/2018 | Egner | H04W 28/08 |
| 2018/0255469 | A1* | 9/2018 | Butchko | H04L 41/147 |
| 2019/0124528 | A1* | 4/2019 | Yu | H04W 24/04 |

OTHER PUBLICATIONS

Extended European Search Report in related European Patent Application No. 16918874.5 dated May 19, 2020, 9 pages.
Jin, S. et al., "Opportunistic Spatial Reuse in IEEE 802.15.3c", IEEE, Transactions on Vehicular Technology, vol. 62, No. 2, Feb. 2013, pp. 824-834.

* cited by examiner

WLAN RF ENVIRONMENT EVALUATION FOR 802.11AC CHANNELS

CROSS REFERENCE TO RELATED APPLICATIONS

This application is the U.S. National Stage of PCT International Application No. PCT/US2016/056792, filed Oct. 13, 2016, the entire disclosure of which is hereby incorporated herein by reference in its entirety.

FIELD OF THE INVENTION

Embodiments of the present invention relate generally to wireless local area networks (WLANs), and specifically to evaluation of WLAN Radio Frequency (RF) Environment for 802.11ac channels.

BACKGROUND OF THE INVENTION

Wireless devices such as smart phones and tablet computing devices continue to proliferate, adding to the total number of mobile devices that seek pervasive Wi-Fi connectivity. Wireless LAN technology continues to evolve as wireless connection speeds advance. Various monitoring tools that monitor wireless networks need therefore be configured to support multiple device types, including legacy 802.11 a/b/g/n devices, and current 802.11ac devices that enable greater than 1 Gbit/s speeds. The IEEE 802.11 ac standard supports a more efficient modulation scheme and may bond wider channel bandwidth, up to 160 MHz, to improve link speed. The 802.11ac standard introduces new features. For example, 802.11 ac introduces 80 MHz and 160 MHz VHT (Very High Throughput) communication channels. Therefore, the ability to efficiently monitor environment in which VHT channel resides in is advantageous to devices utilized for monitoring wireless networks.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a system for evaluating available channels in a multi-channel WLAN telecommunication system is provided. The system includes a wireless Access Point (AP) configured to provide communication with a mobile station over a plurality of Very High Throughput (VHT) channels. The system further includes a plurality of mobile stations (STAs) operating in the plurality of VHT channels. The system further includes a network monitoring device communicatively coupled to the WLAN telecommunication system. The network monitoring device is configured and operable to capture a plurality of VHT data frames exchanged between the wireless AP and the plurality of STAs. The network monitoring device is further configured and operable to decode at least a portion of each of the captured plurality of VHT data frames to identify utilized VHT channel and extract channel allocation information associated with the identified VHT channel and to generate a quality score for the identified VHT channel based on the extracted channel allocation information.

In another aspect, a computer program product for evaluating available channels in a multi-channel WLAN telecommunication system is provided. The computer program product includes one or more computer-readable storage devices and a plurality of program instructions stored on at least one of the one or more computer-readable storage devices. The plurality of program instructions includes program instructions to capture a plurality of data frames exchanged between a wireless access point (AP) and a plurality of mobile stations (STAs). The AP is configured to provide communication with the plurality of STAs over a plurality of Very High Throughput (VHT) channels. The plurality of program instructions further comprises program instructions to decode at least a portion of each of the captured plurality of VHT data frames to identify utilized VHT channel and extract channel allocation information associated with the identified VHT channel and program instructions to generate a quality score for the identified VHT channel based on the extracted channel allocation information.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hard-wired) or temporarily configured (e.g. programmed) to operate in a certain manner and to perform certain operations described herein.

Institute of Electrical and Electronics Engineers (IEEE) 802.11ac is a wireless networking standard that is marketed under the brand name Wi-Fi® and is directed to high-throughput wireless local area networks (WLAN). 802.11ac standard specifies that an entire allowed frequency range be subdivided into a fixed number of relatively narrow bandwidth channels of equal bandwidth, called fundamental channels, and that the devices can transmit using channels of different bandwidths, herein called transmission channels, built from multiple fundamental channels. When the duplicate frames are transmitted in transmission channels, each duplicate frame is transmitted in a fundamental channel. In the case of 802.11ac, the possible channel bandwidths are 20/40/80/160/80+80 MHz. The advantage of channels with wider bandwidths is greater data transmission rates. An advantage of the Sub-1 GHz frequency range is that it allows greater range, and suffers less interference from intervening objects.

Figure 1:
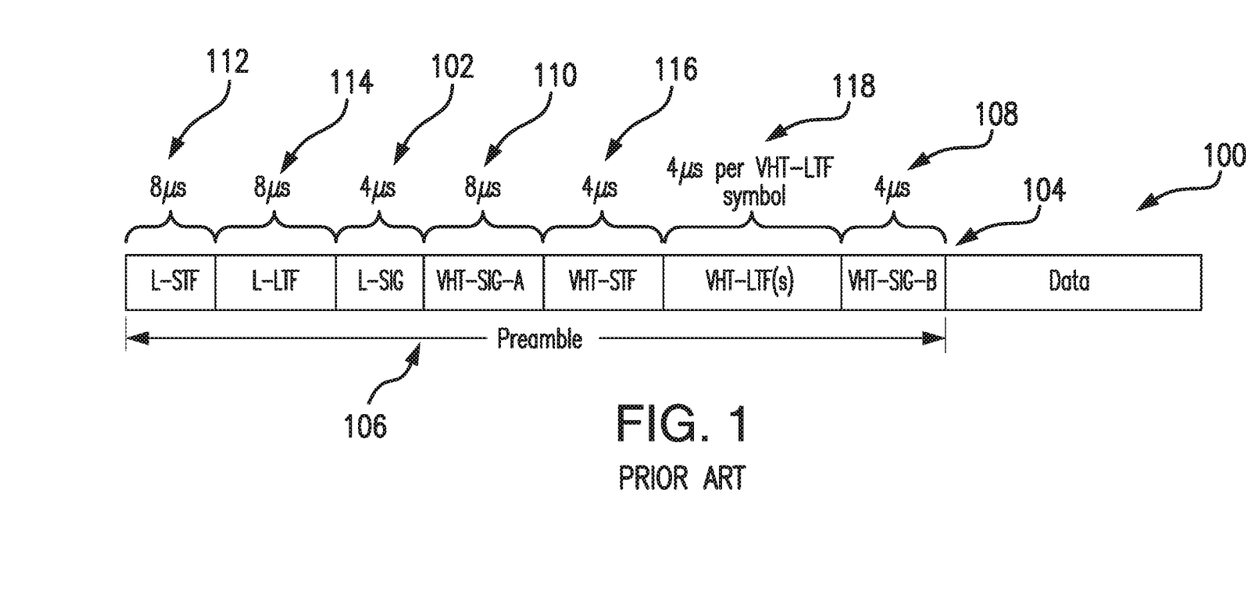
FIG. 1 is a block diagram of a conventional physical layer convergence protocol (PLCP) data unit (PPDU) format.

IEEE 802.11 ac provides a physical layer convergence protocol (PLCP) data unit (PPDU) format that includes a preamble 106 and data 104. The preamble 106 and data 104 are transmitted as Orthogonal Frequency Division Multiplexing (OFDM) symbols. The PPDU format 100 is shown in FIG. 1. The preamble 106 includes (i) legacy fields applicable to IEEE 802.11a and IEEE 802.1 in, and (ii) fields specific to IEEE 802.11 ac. The legacy fields include a legacy short training field (L-STF) 112, a legacy long training filed (L-LTF) 114, and a legacy signal field (L-SIG) 102. The fields specific to IEEE 802.11ac include a first VHT signal (VHT-SIG-A) field 110, a VHT short training field (VHT-STF) 116, one or more VHT long training fields (VHT-LTFs) 118, and a second VHT signal (VHT-SIG-B) field 108. The L-STF 112, L-LTF 114, L-SIG 102, VHT-SIG-A 110, VHT-STF 116, VHT-LTFs 118, and VHT-SIG-B 108 fields have respective time durations, as shown in FIG. 1.

The legacy fields are used for backward compatibility with network devices operating according to IEEE 802.11a and/or IEEE 802.11n standards. The L-STF 112 is used for start of packet detection, automatic gain control, initial frequency offset estimation, and initial time synchronization. The L-LTF 114 is used for fine frequency offset estimation, time synchronization, and channel estimation. The L-SIG field 102 is used for determining data rate and length information and time to remain "off air".

The VHT-SIG-A field 110 identifies: whether packets are IEEE 802.11n or IEEE 802.11ac packets; a bandwidth; a number of data streams; a guard interval; a type of coding; a modulation and coding scheme (MCS); and whether packets are beamforming packets. The VHT-STF 116 is used to improve automatic gain control for multiple-input-multiple-output (MIMO) network devices. One or more VHT-LTFs 118 are included in the PPDU depending on a number of data streams and/or users (network devices) in the corresponding WLAN. Each of the VHT-LTFs 118 is a single symbol in length and has a long training sequence that is used for channel estimation.

The VHT-SIG-B field 108 is a single symbol in length and provides user specific information including data length and MCS information. The VHT-SIG-B field 108 is primarily used for multiple user (MU) applications and is typically ignored for single user (SU) applications. The VHT-SIG-B field 108 may include a predetermined number of length bits and a predetermined number of tail bits. Depending on a bandwidth (e.g., 20 mega-hertz (MHz), 40 MHz, 80 MHz, 160 MHz or noncontiguous 160 MHz (referred to as 80+80 MHz)) allocated for transmission of the VHT-SIG-B field 108, the length bits and the tail bits may be repeated a predetermined number of times.

As noted above, generally, a set of operating bandwidths may include VHT channels including 20, 40, 80 only, 80+80 and 160 MHz transmission channels. In one embodiment, six transmission channels with 80 MHz bandwidth can be used as the VHT transmission channels. In this embodiment, each 80 MHz transmission channel may comprise four contiguous 20 MHz fundamental channels.

IEEE 802.11a is a standard, otherwise referred to as 802.11a channelization. The IEEE 802.11a standard specifies a data rate up to 54 Mbits/second using the 5 GHz radio band. In the United States, the 5 GHz radio band is a conglomerate of three bands: 5.170 to 5.250 GHz (U-NII-1); 5.250 to 5.350 GHz (U-NI I-2A); and 5.725 to 5.835 GHz (U-NI 1-3). The 5 GHz band contains 20 MHz fundamental channels 36, 40, 44, and 48 in U-NII-1; 20 MHz fundamental channels 52, 56, 60, 64 in U-NI I-2A; 20 MHz fundamental channels 100, 104, 108, 112, 116, 120, 124, 128, 132, 136, and 140 in U-NI I-2C; and 20 MHz channels 149, 153, 157, 161 in U-NI I-3.

The following disclosed embodiments present a method to monitor and evaluate WLAN RF environment for the acquisition of VHT channels. In accordance with an illustrated embodiment of the present invention, reference is now made to FIG. 2 which is an exemplary and non-limiting diagram illustrating a network architecture to which embodiments of the present invention are applicable. In the illustrated embodiment of FIG. 2, wireless communication system 200 can include a network of one or more access points (APs) 204 that are configured to communicate with one or more wireless stations (STAs) 202. An AP 204 can emit radio signals that carry management information, control information or users' data to one or more wireless stations 202. An STA can also transmit radio signals to an AP in the same frequency channel via time division duplexing (TDD) or in different frequency via frequency division duplexing (FDD). For example, in the illustrated wireless communication system 200, the channel bonding procedure allows for bonding and operating one of the six VHT transmission channels having 80 MHz bandwidth.

Figure 2:
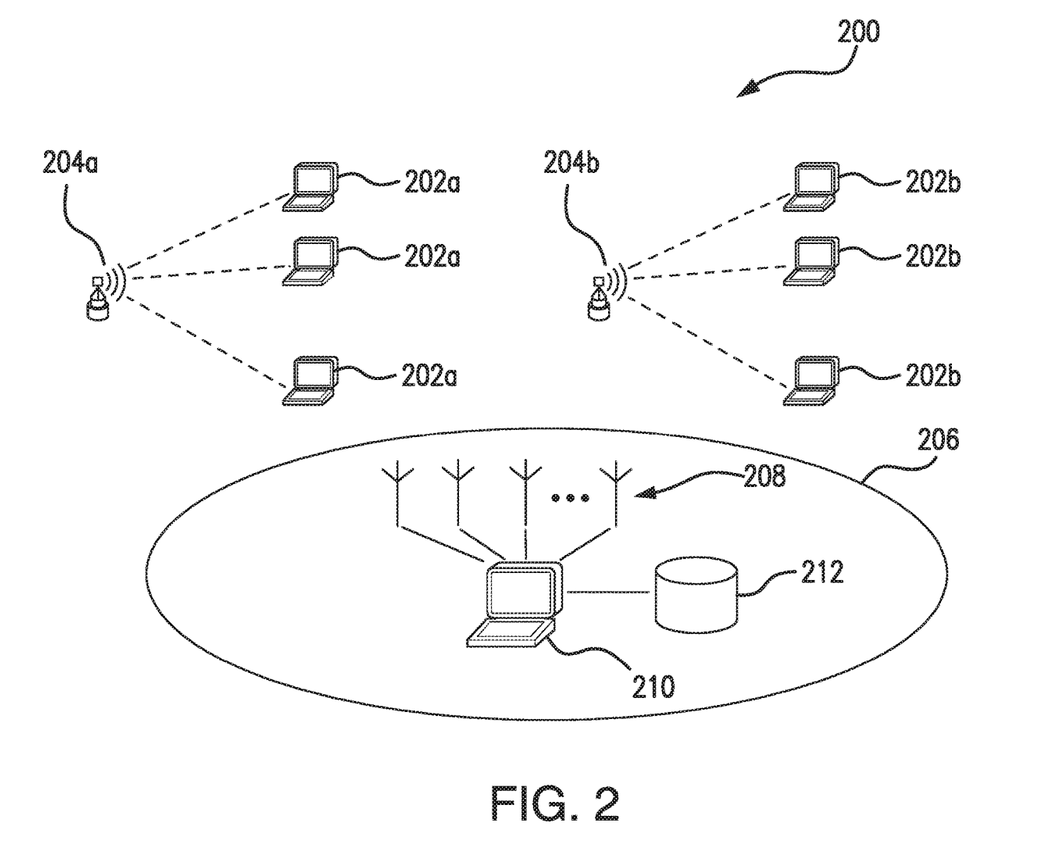
FIG. 2 shows an exemplary architecture of a multi VHT channel WLAN telecommunication system, according to one embodiment of the present invention.

It is to be understood and appreciated in IEEE 802.11ac environment, wireless stations (also called stations, e.g., STAs 202a and STAs 202b in FIG. 2) associated in the radio coverage area establish a BSS (basic service set) and provide basic service of WLAN. A BSS built around an AP is called an infrastructure BSS. FIG. 2 illustrates an example of two infrastructure BSSes formed by two APs. The first BSS contains a first AP 204a and a first plurality of STAs 202a. The first AP 204a maintains associations with the STAs 202a. The second BSS contains a second AP 204b and a second plurality of STAs 202b. The second AP 204b maintains associations with the second plurality of STAs 202b. Various STAs 202 may support a number of different sizes of channels. For example, the first plurality of STAs 202a and the second plurality of STAs 202b can support VHT channel 80 MHz bandwidth reception and transmission.

The APs 204a, 204b may implement an MCS for communicating with one of the STAs 202 (i.e., SU mode) or with a plurality of the STAs 202 (i.e., MU mode). The MCS may be selected from a set of indexed MCSs. Each MCS (e.g., MCS 0 through MCS 9) may have an associated transmission or data rate. Further, each MCS may have an associated packet error rate (PER).

Multiple STAs 202 associated with a particular AP through, for example, MU pairing can have the respective capabilities. Depending on the type, purpose, channel conditions, and the like of individual STA 202, bandwidth, MCS, forward error correction (FEC), etc. can be varied.

Advantageously, the wireless communication system 200 further includes a WLAN monitoring system 206 that is able to monitor wireless local area network signals. In one embodiment, the monitoring system 206 comprises a plurality of WLAN signal detectors 208, a monitoring computing device 210 communicatively coupled to the plurality of signal detectors 208 and a database 212 for storing information related to at least WLAN devices capabilities and associations. The monitoring system 206 may include any number of signal detector elements 208. Thus, in one embodiment, the detector elements 208 may include two or more receive elements (e.g., multiple antennas) for receiving wireless signals over the air interface.

In various embodiments, the monitoring computing device 210 may comprise any suitable computing device, such as, but not limited to, a personal computer (PC), laptop computer, smart phone or other computing device having a processor, a memory and a user interface. The monitoring computing device 210 is configured to run a software component to monitor channel availability and quality (such as, but not limited to 80 MHz VHT transmission channel quality) in the wireless communication system 200. The monitoring computing device 210 also communicates with the database 212 for logging and accessing various data associated with communications (e.g., channel allocation information). The database 212 may be a single database, table, or list, or a combination of databases, tables, or lists.

In various embodiments, the database 212 can be a stand-alone database or it can be a component of the monitoring computing device 210.

Figure 3:
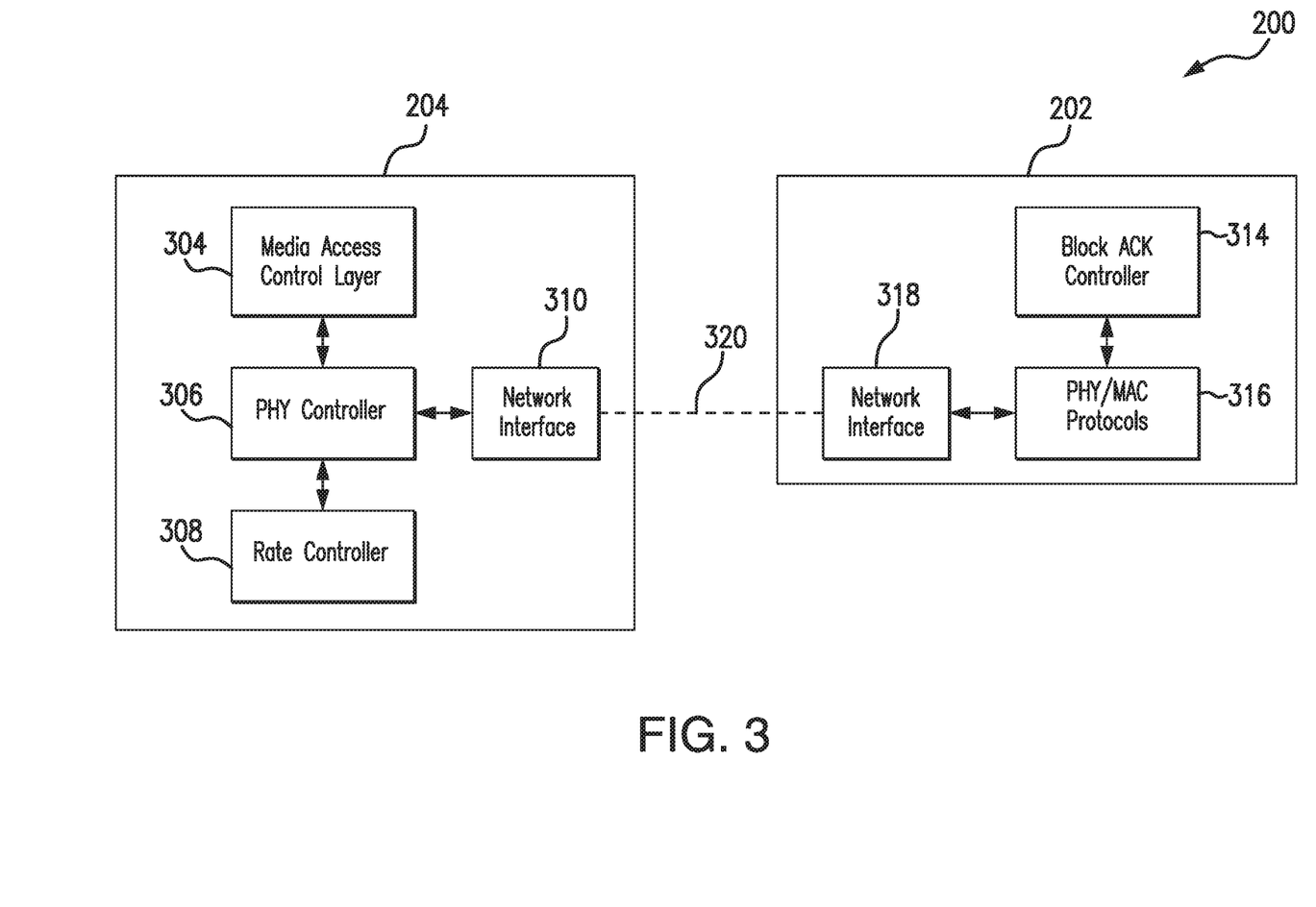
FIG. 3 shows a more detailed block diagram of AP and STA devices of FIG. 2, in accordance with various embodiments of the present disclosure.

Turning now to FIG. 3, a wireless communication system 200 may include an AP 204, such as the AP 204a, 204b described with respect to FIG. 2. The AP 204 may include a media access control (MAC) layer 304, a physical (PHY) controller 306, a rate controller 308 and a network interface 310. The MAC layer 304 may include functionality to implement frame aggregation and cause a PPDU frame to be transmitted via the network interface 310.

Conventionally, the rate controller 308 may adjust the PHY transmission rate based on channel conditions, such as bit error rate (BER), signal-to-noise ratio, or power limitations. The rate controller 308 may select or adjust the MCS used for transmissions. For example, different MCSs may be associated with different data transmission rates. The use of an MCS involves the coding of data into symbols in a modulation scheme. A greater number of symbols may allow for a greater number of bits to be represented by each symbol. Therefore, a higher MCS indicates modulation using greater numbers of bits for each symbol. A higher MCS may be associated with a higher PHY transmission rate because more data may be communicated in each transmission.

The wireless communication system 200 may further include the STA 202, such as one of the STAs 202 described with respect to FIG. 2. The STA 202 may include a block acknowledgement (Block ACK) controller 314, PHY/MAC protocols 316 and a network interface 318. The network interface 318 may be coupled to a communications channel 320 for communications between the STA 202 and the AP 204 via the network interface 318. In one example, the communications channel 320 is a WLAN wireless VHT channel configured for IEEE 802.11ac or other types of WLAN protocols which utilize frame aggregation techniques.

The AP 204 may transmit the PPDU frame 100 to the STA 202 via the communications channel 320 using a first MCS. In response, the Block ACK controller 314 may generate a BA frame to indicate acknowledgement/non-acknowledgement (ACK/NAK) for a series of PDUs included in the received PPDU frame 100. The BA frame may be transmitted from the STA 202 to the AP 204 via the communications channel 320.

According to one solution described herein, the rate controller 308 may be configured to adjust the MCS (e.g., select a different MCS) based at least in part upon a MAC efficiency determined for the STA 202 using the first MCS. The rate controller 308, or another component of the AP 204 such as a processor (not shown), may determine the MAC efficiency based at least in part on a real-time MU PPDU length and the first MCS. Thus, the MAC efficiency may be determined using the BA and other information.

Figure 4:
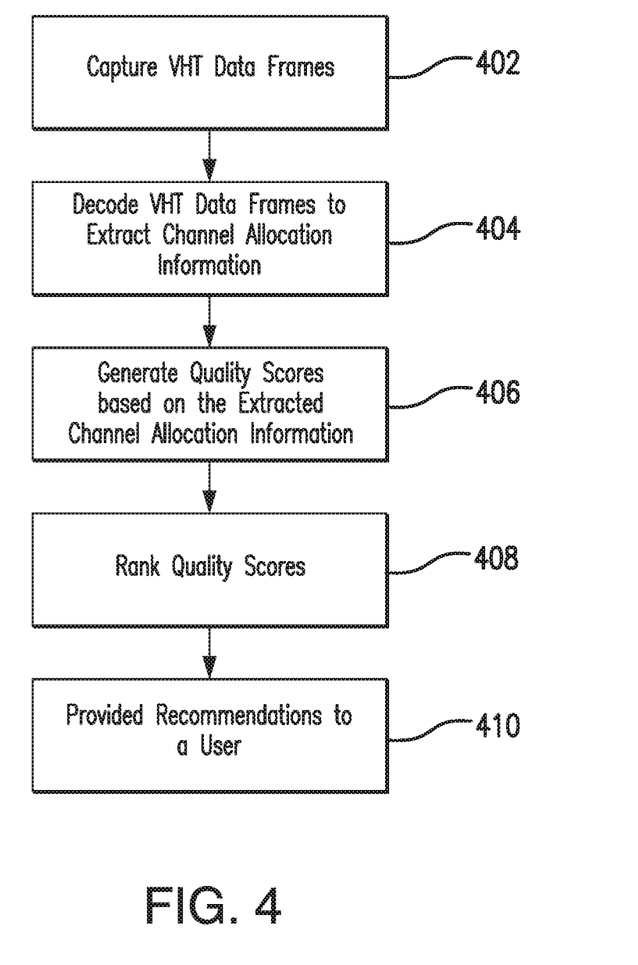
FIG. 4 is a flowchart illustrating monitoring of VHT channel environment in the multi VHT channel WLAN telecommunication system of FIG. 2, in accordance with an illustrated embodiment of the present invention.

FIG. 4 is a flowchart illustrating a method for monitoring of VHT channel environment in the multi VHT channel WLAN telecommunication system of FIG. 2, in accordance with an illustrated embodiment of the present invention. Before turning to description of FIG. 4, it is noted that the flow diagram in this figure shows an example in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be performed. As will be appreciated by one skilled in the art, aspects of the present invention may be embodied as a method or computer program product. In some embodiments, the method described below may be performed, at least in part, by one or more components of the monitoring system 206, such as, but not limited to, the monitoring computing device 210.

The example embodiments are applicable to devices compatible with VHT protocols of the IEEE 802.11 standards, which are configured to exchange data frames, among other types of frames. At step 402, the monitoring computing device 210 obtains captured VHT data frames.

According to embodiments of the present invention, at step 404, the monitoring computing device 210 decodes each captured data frame. The L-SIG field 102 (shown in FIG. 1) includes control information for demodulating and decoding the data field 104. In this step, the monitoring device 102 may decode channel and sub-channel allocation information. Sub-channel allocation information indicating sub-channels allocated to respective STAs 202 may be included in a preamble part 106 of the PPDU 100. Namely, by indicating to which STA 202 a data frame of each sub-channel is intended to be transmitted thereafter in the preamble part 106, the STAs 202 may check which sub-channel they have been allocated. Thus, thereafter, each STA 202 may decode only the corresponding sub-channel portion allocated thereto to acquire data.

As noted above, the VHT-SIG-B field 108 includes dedicated control information necessary for a plurality of MIMO paired STAs 202 to receive the PPDUs 100 to obtain data. Accordingly, only when the control information included in the PPDU 100 indicates that the currently received PPDU 100 is MU-MIMO transmitted, the monitoring computing device 210 may be designed to decode the VHT-SIG-B field 108. On the contrary, in case the control information included in the VHT-SIG-A field 110 indicates that the currently received PPDU 100 is one for a single STA (including SU-MIMO), the monitoring device 210 may be designed not to decode the VHT-SIG-B field 108.

According to an embodiment of the present invention, multiple STAs 202 and APs 204 communicating with each other over VHT channels can be grouped by the monitoring device 210 into distinct groups based on which channel they have been allocated. The corresponding data frames transmitted over the VHT channels can also be grouped into the same distinct groups. In detail, the grouping of received data frames may be implemented by the monitoring device 210 as shown in Table 1:

TABLE 1

| Group # | Meaning |
| --- | --- |
| 0 | Channel 0 is allocated |
| 1 | Channel 1 is allocated |
| 2 | Channel 2 is allocated |
| 3 | Channel 3 is allocated |
| 4 | Channel 4 is allocated |
| 5 | Channel 5 is allocated |

Since the monitoring computing device 210 also decodes the MCS information for each received data frame, at step 404, the data frames grouped into the six groups as described above can be further categorized by the MCS they use.

Next, at step 406, the monitoring device 210 generates quality scores associated with each channel based on the extracted channel allocation information. In one embodiment, the monitoring device 210 may maintain a data structure for tracking data frames. The data structure may comprise a two-dimensional array, wherein a first dimension stores channel information and a second dimension stores associated MCS information. For example, with reference to the aforementioned examples, the monitoring device 210 may define an array, such as DataFrameArray [channel][mcs] to count the number of data frames transmitted over the VHT channels for each VHT and each MCS. It should be noted that each channel value $\in[0, 5]$, while each mcs value $\in[0, 9]$.

According to an embodiment of the present invention, at step 408, the monitoring device 210 also assigns a plurality of weighting factors to the acquired MCS information. In one embodiment, these weighting factors are greater than 0 and less than or equal to 1. For example, the monitoring device may utilize Table 2 below to assign the plurality of weighting factor values to an illustrative array MCSWeight:

TABLE 2

| MCSWeight[mcs] | Weighting Factor |
| --- | --- |
| mcs = 0 | 0.1 |
| mcs = 1 | 0.2 |
| mcs = 2 | 0.3 |
| mcs = 3 | 0.4 |
| mcs = 4 | 0.5 |
| mcs = 5 | 0.6 |
| mcs = 6 | 0.7 |
| mcs = 7 | 0.8 |
| mcs = 8 | 0.9 |
| mcs = 9 | 1 |

In one embodiment, the monitoring device 210 generates the aforementioned quality scores for each of the identified VHT channels based, at least in part, on the extracted channel allocation information and weighting factors stored in the DataFrameArray and MCSWeight array, respectively. In this embodiment, the monitoring device 120 applies the following formula (1) to generate and store a plurality of quality scores in an exemplary ChannelScore [channel] data structure:

$$ChannelScore[\text{channel}] = \frac{\sum_{mcs}\left(\begin{array}{c}DataFrameArray\\ [\text{channel}][mcs] *\\ MCSWeight[mcs]\end{array}\right)}{\sum_{mcs} DataFrameArray[\text{channel}][mcs]} \quad (1)$$

In other words, at step 406, the monitoring device 210 assigns a score to each of the six 80 MHz VHT channels using formula (1).

Next, at step 408, the monitoring device 210 generates VHT channel rankings based on the scores generated in step 406. In one embodiment, the monitoring device 210 sorts the generated quality scores and classifies the available VHT channels into a plurality of groups based upon the generated quality scores. Various types of numerical rating scales can be potentially used to group the channel quality scores, and for this example, a range of (0.85, 1] has been chosen to indicate a "good" quality channel and ranges (0.55, 0.85], (0.35, 0.55] and (0.1, 0.35] can be interpreted as "moderate", "poor" and "bad", respectively. This particular rating system provides more information than the numeric quality scores generated in step 406. In one embodiment, one or more predetermined thresholds can set the boundary between rating groups to identify the quality scores that are considered to be similar and those that are considered to be dissimilar. A predetermined threshold can comprise a quantitative value, qualitative value, conditional statement or conditional expression (e.g., if-then construct), and/or mathematical statement (e.g., equality statement, inequality statement) to indicate the actual value and boundary characteristic(s) of the threshold.

According to an embodiment of the present invention, at step 410, the channel quality information may be optionally reported by the monitoring device 210 to a user (e.g., via a user interface) based on the generated channel quality scores and/or based on channel rankings described above. In some embodiments, the monitoring device 210 may calculate VHT channel rankings for a particular time interval. The user interface (i.e., Graphical User Interface (GUI)) can include a display output graphically illustrating information received from the monitoring device 210. Examples of displayed information and selected format include: channel quality status for each of 80 MHz channels in the WLAN environment displayed in a color-coded format (e.g., a particular color may be interpreted as a particular VHT channel group); present color-coded symbols representing APs 204 and/or STAs 202 to indicate the RF environment status the represented APs 204 or STAs 202 are working in using a symbolic graph-like format (i.e., color-coded FIG. 2, for example). Furthermore, at step 410, the monitoring device 210 may provide one or more suggestions (via the GUI) based on the information calculated in steps 406 and 408. For example, the monitoring device 210 may suggest which 80 MHz channel should be utilized by the APs/STAs to be deployed. As another non-limiting example, the monitoring device 210 may suggest which APs can provide a better service to a particular STA.

In view of the above, an example of a system for evaluating available VHT channels in a multi-channel WLAN telecommunication system consistent with embodiments of the present invention includes a network monitoring device capable of evaluating the VHT channels by assigning quality scores to each channel. Although the embodiments described above are directed to a wireless system using six 80 MHz VHT channels, this is for exemplary purposes only. The embodiments described above can equally apply to a wireless system having a transmission channel bandwidth of 20 MHz, 40 MHz or 160 MHz, for example. Furthermore, the above description equally applies to contiguous and non-contiguous, such as, but not limited to, 40 MHz+40 MHz or 80 MHz+80 MHz non-contiguous channels. Further, in such wireless communication system the monitoring device may group the evaluated VHT channels and rank the groups based on the calculated quality scores.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN) or WLAN, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
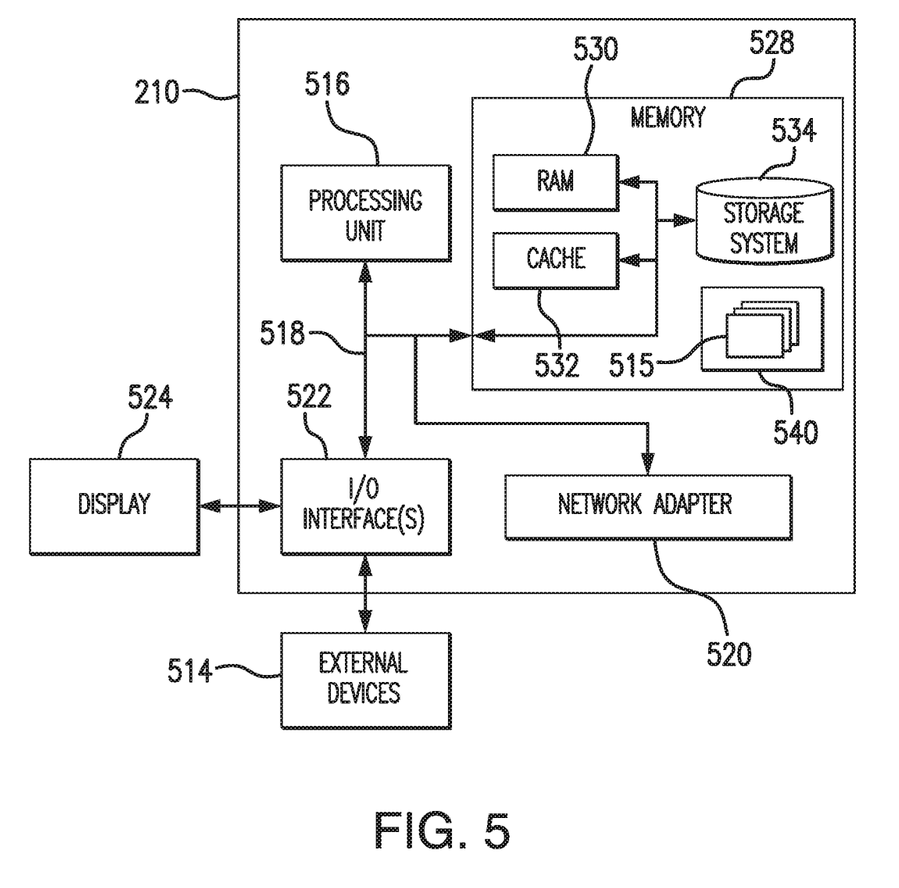
FIG. 5 is a block diagram of a computer system configured to implement various methods described herein according to some embodiments of the present invention.

Embodiments of the network monitoring system may be implemented or executed by one or more computer systems. One such computer system, the monitoring computing device 210 is illustrated in FIG. 5. In various embodiments, network monitoring system 210 may be a server, a distributed computer system, a workstation, a network computer, a desktop computer, a laptop, a tablet, a wireless device or the like.

The monitoring computing device 210 is only one example of a suitable system and is not intended to suggest any limitation as to the scope of use or functionality of embodiments of the invention described herein. Regardless, the monitoring computing device 210 is capable of being implemented and/or performing any of the functionality set forth hereinabove.

The monitoring computing device 210 is operational with numerous other general purpose or special purpose computing system environments or configurations. Examples of well-known computing systems, environments, and/or configurations that may be suitable for use with the network monitoring system 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

The components of the monitoring computing device 210 may be described in the general context of computer system-executable instructions, such as program modules, being executed by a computer system. Generally, program modules may include routines, programs, objects, components, logic, data structures, and so on that perform particular tasks or implement particular abstract data types. The monitoring computing device 210 may be practiced in distributed data processing environments where tasks are performed by processing devices that are linked through a communications network. In a distributed data processing environment, program modules may be located in both local and remote computer system storage media including memory storage devices.

The monitoring computing device 210 is shown in FIG. 5 in the form of a general-purpose computing device. The components of the monitoring computing device 210 may include, but are not limited to, one or more processors or processing units 516, a system memory 528, and a bus 518 that couples various system components including the system memory 528 to the processor 516.

The bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The monitoring computing device 210 typically includes a variety of computer system readable media. Such media may be any available media that is accessible by the monitoring computing device 210, and it includes both volatile and non-volatile media, removable and non-removable media.

The system memory 528 can include computer system readable media in the form of volatile memory, such as a random access memory (RAM) 530 and/or a cache memory 532. The monitoring computing device 210 may further include other removable/non-removable, volatile/non-volatile computer system storage media. By way of example only, a storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 518 by one or more data media interfaces. As will be further depicted and described below, the memory 528 may include at least one program product having a set (e.g., at least one) of program modules that are configured to carry out the functions of embodiments of the invention.

Program/utility 540, having a set (at least one) of program modules 515 may be stored in the memory 528 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The monitoring computing device 210 may also communicate with one or more external devices 514 such as a keyboard, a pointing device, a display, etc.; one or more devices that enable a user to interact with the monitoring computing device 210; and/or any devices (e.g., network card, modem, etc.) that enable the monitoring computing device 210 to communicate with one or more other computing devices. Such communication can occur via Input/Output (I/O) interfaces 522. Still yet, the monitoring computing device 210 can communicate with one or more networks such as a LAN, a WAN, a WLAN and/or a public network (e.g., the Internet) via a network adapter 520. As depicted, the network adapter 520 communicates with the other components of monitoring computing device 210 via the bus 518. It should be understood that although not shown, other hardware and/or software components could be used in conjunction with the monitoring computing device 210. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for evaluating available channels in a multi-channel WLAN telecommunication system, the system comprising:
    a wireless access point (AP) configured to provide communication with a mobile station over a plurality of Very High Throughput (VHT) channels, wherein the plurality of VHT channels has a bandwidth of 20 MHz, 40 MHz, 80 MHz or 160 MHz;
    a plurality of mobile stations (STAs) operating in the plurality of VHT channels; and
    a network monitoring device communicatively coupled to the WLAN telecommunication system, wherein the one or more network monitoring devices are configured and operable to:
    capture a plurality of VHT data frames exchanged between the wireless AP and the plurality of STAs;
    decode at least a portion of each of the captured plurality of VHT data frames to identify utilized VHT channel and extract channel allocation information associated with the identified VHT channel; and
    generate a quality score for the identified VHT channel based on the extracted channel allocation information.

2. The system as recited in claim 1, wherein the extracted channel allocation information comprises modulation and coding scheme (MCS) information.

3. The system as recited in claim 2, wherein the MCS information includes any one of the following: coding rate and modulation.

4. The system as recited in claim 1, wherein the network monitoring device configured and operable to capture the plurality of VHT data frames is further configured and operable to group the plurality of captured VHT data frames based on the identified VHT channel.

5. The system as recited in claim 3, wherein the network monitoring device configured and operable to generate the quality score is further configured and operable to maintain a multi-dimensional array, wherein the multi-dimensional array is configured to store at least VHT channel and MCS information for each captured VHT data frame.

6. The system as recited in claim 3, wherein the network monitoring device configured and operable to generate the quality score is further configured and operable to assign a plurality of weighting factors to the extracted MCS information.

7. The system as recited in claim 6, wherein each of the plurality of weighting factors is greater than 0 and less than or equal to 1.

8. The system as recited in claim 1, wherein the network monitoring device is further configured and operable to sort the generated quality scores and classify the available VHT channels into a plurality of groups based on the generated quality scores.

9. The system as recited in claim 8, wherein each of the plurality of groups is associated with a range of the generated quality scores.

10. A non-transitory computer program product for evaluating available channels in a multi-channel WLAN telecommunication system, the computer program product comprising:
    one or more computer-readable storage devices and a plurality of program instructions stored on at least one of the one or more computer-readable storage devices, the plurality of program instructions comprising:
    program instructions to capture a plurality of data frames exchanged between a wireless access point (AP) and a plurality of mobile stations (STAs), the AP configured to provide communication with the plurality of STAs over a plurality of Very High Throughput (VHT) channels, wherein the plurality of VHT channels has a bandwidth of 20 MHz, 40 MHz, 80 MHz or 160 MHz;
    program instructions to decode at least a portion of each of the captured plurality of VHT data frames to identify utilized VHT channel and extract channel allocation information associated with the identified VHT channel; and
    program instructions to generate a quality score for the identified VHT channel based on the extracted channel allocation information.

11. The computer program product as recited in claim 10, wherein the extracted channel allocation information comprises modulation and coding scheme (MCS) information.

12. The computer program product as recited in claim 11, wherein the MCS information includes any one of the following: coding rate and modulation.

13. The computer program product as recited in claim 10, wherein the plurality of program instructions to capture the plurality of data frames further comprises program instructions to group the plurality of captured VHT data frames based on the identified VHT channel.

14. The computer program product as recited in claim 12, wherein the plurality of program instructions to generate the quality score further comprises program instructions to maintain a multi-dimensional array, wherein the multi-dimensional array is configured to store at least VHT channel and MCS information for each captured VHT data frame.

15. The computer program product as recited in claim 12, wherein the plurality of program instructions to generate the quality score further comprises program instructions to assign a plurality of weighting factors to the extracted MCS information.

16. The computer program product as recited in claim 15, wherein each of the plurality of weighting factors is greater than 0 and less than or equal to 1.

17. The computer program product as recited in claim 10, wherein the plurality of program instructions further comprise program instructions to sort the generated quality scores and classify the available VHT channels into a plurality of groups based on the generated quality scores.

18. The computer program product as recited in claim 17, wherein each of the plurality of groups is associated with a range of the generated quality scores.

* * * * *